Oct. 29, 1935.  R. SCHMIDT  2,018,812
PRINTING SOUND AND MOVING PICTURE FILMS
Filed Jan. 6, 1932
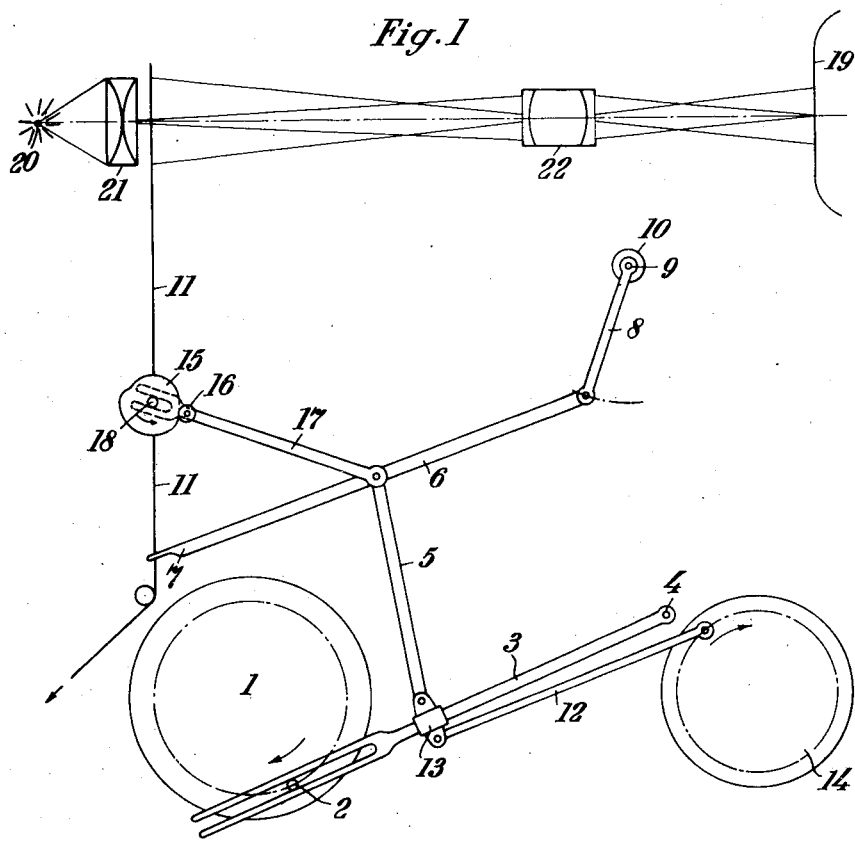
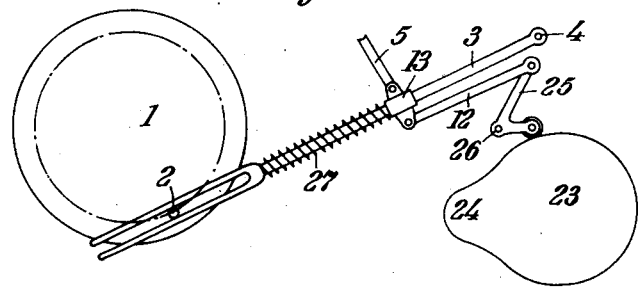
Inventor:
Richard Schmidt,
By  Attorney
Philip S. Hopkins Patented Oct. 29, 1935

2,018,812

UNITED STATES PATENT OFFICE 2,018,812

PRINTING SOUND AND MOVING PICTURE FILMS

Richard Schmidt, Dessau, in Anhalt, Germany, assignor to Agfa Ansco Corporation, Binghamton, N. Y., a corporation of New York Application January 6, 1932, Serial No. 585,096
In Germany January 7, 1931

3 Claims. (Cl. 88—24)

My present invention relates to a process of printing sound and picture negatives.

One of its objects is to provide a process of printing sound and picture negatives taken on standard films onto films of a smaller size especially onto substandard film of 16 mm. breadth. Further objects will be seen from the detailed specification following hereafter.

The apparatus for taking and reproducing sound pictures on standard size are generally run at a speed of 456 mm. per second corresponding to 24 changes per second of the pictures, whereas the apparatus for reproducing sound pictures being on substandard films are run only at a speed of 16 changes per second, so that for reproducing a scene of a definite number of pictures being on substandard film 50 per cent more time is wanted than for the reproduction of the same scene if being on standard film.

The movements shown in the pictures being on substandard film, therefore, appear at a reduced speed with regard to those on normal film. In general, this is not very inconvenient with silent films, it causes, however, distortion of tones in the reproduction of sound films, since, under the aforesaid conditions, the sound records on substandard film can produce within the unit of time, only ⅔ of the oscillations (frequencies) recorded on the standard film.

I have found that any dissonance in the reproduction of the sounds registered on substandard film (the sound track being formed by printing from standard film) is eliminated when printing a sound film negative recorded on standard film, onto a film of smaller size in a continuous manner by reducing it optically, and moving the negative film at a speed which is by so much higher as compared with that of the positive film of smaller size, for instance, substandard film that the reproduction of corresponding lengths of the sound records on the negative and on the positive takes the same time.

When thus printing negatives taken on standard films onto a film of smaller size it is furthermore necessary to compensate for the above explained retardation of the movements which is not very inconvenient with silent films, since otherwise the pictures and the sounds are no longer synchronous on the print. A compensation by moving the negative and the positive film at different speeds is not possible for obvious reasons. As soon as the number of pictures on the film of smaller size produced per second differs from the number of pictures on standard film care must be taken that the number of pictures in excess on the normal film is not printed on the film of smaller size, while paying attention that the number of the omitted pictures is distributed as equal as possible over the series of pictures printed per second. The compensation is brought about in the case of copying on substandard film by printing the succession of pictures being on the standard film intermittently while leaving every third picture unprinted. This may be achieved by interrupting the propulsion of the substandard film at every third picture change and obturating the picture window simultaneously or by advancing the negative film at every second change by the length of two pictures.

I will now describe my invention with reference to the accompanying drawing. In the drawing there is shown in Fig. 1 diagrammatically an arrangement for printing standard film onto substandard film. This arrangement comprises a device which allows of advancing the film in such a manner that in the first step there is forwarded the length of one picture and in the second step the length of two pictures of the standard film.

The crank disc 1 imparts by aid of the crank pin 2 to the lever 3 which is fixed in 4, an oscillating motion. This motion is transmitted by the coupling rod 5 to a lever 6 being provided at one end with a gripper 7, the other end being linked to a lever 8 fixed in the point 9 and being pressed in direction of the film 11 by means of a spring 10. The rate of the transmission depends upon the situation of the collar 13 gliding on the lever which is controlled by the connecting rod 12 and the crank disc 14 having half the number of revolutions of the crank disc 1. In order to provide that during the motion of the gripper in one direction the gripper is in gear with the film and in the opposite direction is out of gear, a curve shaped disc 15, whose number of revolutions corresponds to that of the crank disc 1, influences a pin 16 mounted on the rod 17. This rod 17 is with its one end preferably linked to the middle point of lever 6 and the other end being formed in a fork slides about the axes 18 of the curved disc 15. The spring 10 causes the pin 16 to be in touch with disc 15.

For copying the standard film 11 onto the substandard film 19 the light coming from the source of light is projected by means of the condenser lens 21 through the film 11 and by means of the lens 22 on the film 19. The film 19 is as usual advanced intermittently picture for picture, whereas the film 11 is advanced in such a manner that alternately with one picture of the film 19 one and two pictures of the film 11 are advanced. In this manner every third picture of film 11 is omitted on film 19. The special kind of advancing film 11 is effected by the arrangement above described which acts in the following manner. During two revolutions of the crank disc 1 the crank disc 14 makes one revolution. In the first revolution of the crank disc 1 the collar 13 is situated near the left end of the lever 3 causing the large step of the gripper 7 (two pictures). During the second revolution of the crank disc 1 the collar 13 is near the right (fixed) end of the lever 3 causing in this position the small step of the gripper (one picture).

The device shown in Figure 1 for advancing alternately one and two pictures of a film, thus omitting every third picture in the printing operation, can in a simple manner be adapted for omitting one picture of the film to be printed in any desired periodicity. Fig. 2 illustrates diagrammatically such an arrangement, the crank disc 14 of Fig. 1 being replaced by the cam disc 23 provided with the cam 24 and the sliding lever 25 fixed in point 26. In this case the collar 13 is kept by the spring 27 in the position near the fixing point 4 of lever 3 during the forwarding of one picture. For advancing two pictures, the cam 24 of the cam disc displaces the collar 13 by means of the rod 12 towards the crank disc 1 for the time wanted for advancing two pictures.

What I claim is:

1. In a printing apparatus for printing sound and picture negatives taken on standard-film, means for intermittently advancing the standard-film so as to omit periodically one picture area from the printing operation comprising in combination, a film, a crank disc operating a lever rotatable about a pivot, a collar glidably mounted on said lever, means for causing said collar to glide on said lever, a gripper, means for bringing the gripper in gear and out of gear with said film, and a rod connecting said gripper with said lever operated by the crank disc.

2. In a printing apparatus for printing sound and picture negatives taken on standard-film means for intermittently advancing the standard-film so as to omit periodically one picture area from the printing operation comprising in combination, a crank disc operating a lever rotatable about a pivot, a collar glidably mounted on said lever, a cam disc provided with a cam, a lever mechanism one of its ends being linked to said collar and the other being in touch with said cam disc, a curve shaped disc rotatable about an axle, a lever being at one end provided with a gripper, the other end being linked to a lever rotatable about a pivot, a rod being with one end glidably connected with the axle of said curve shaped disc and bearing a pin in touch with the curve of said curve shaped disc, the other end of said rod being connected with the lever bearing the gripper, a spring pressing the rod provided with the pin against the curve shaped disc, and a rod connecting the lever provided with the gripper with the lever operated by the crank disc.

3. In a printing apparatus for printing sound and picture negatives taken on standard-film means for intermittently advancing the standard-film so as to omit periodically one picture area from the printing operation comprising in combination, a first crank disc operating a lever rotatable about a pivot, a collar glidably mounted on said lever, a cam disc provided with a cam, a second crank disc having half the diameter of the first crank disc connected to said collar by means of a rod, a curve shaped disc rotatable about an axle, a lever being at one end provided with a gripper, the other end being linked to a lever rotatable about a pivot, a rod being with one end glidably connected with the axle of said curve shaped disc and bearing a pin in touch with the curve of said curve shaped disc, the other end of said rod being connected with the lever bearing the gripper, a spring pressing the rod provided with the pin against the curve shaped disc, and a rod connecting the lever provided with the gripper with the lever operated by the first crank disc.

RICHARD SCHMIDT.